US009158898B2

(12) United States Patent
Moroney et al.

(10) Patent No.: US 9,158,898 B2
(45) Date of Patent: Oct. 13, 2015

(54) SYSTEM AND METHOD FOR MANAGED DISTRIBUTION OF PUBLICATION ASSETS

(75) Inventors: Nathan Moroney, Palo Alto, CA (US); Udi Chatow, Palo Alto, CA (US); Meghan Kennedy, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1567 days.

(21) Appl. No.: 12/431,474

(22) Filed: Apr. 28, 2009

(65) Prior Publication Data

US 2010/0274605 A1    Oct. 28, 2010

(51) Int. Cl.

| | |
|---|---|
| G06Q 99/00 | (2006.01) |
| G06F 21/10 | (2013.01) |
| G06F 17/21 | (2006.01) |
| G06Q 10/06 | (2012.01) |
| G06Q 30/02 | (2012.01) |
| G06Q 50/00 | (2012.01) |
| G06Q 50/04 | (2012.01) |
| G06Q 20/12 | (2012.01) |

(52) U.S. Cl.
CPC .............. *G06F 21/10* (2013.01); *G06F 17/214* (2013.01); *G06Q 10/06* (2013.01); *G06Q 30/0241* (2013.01); *G06Q 20/1235* (2013.01); *G06Q 50/00* (2013.01); *G06Q 50/04* (2013.01)

(58) Field of Classification Search
CPC ... G06Q 20/1235; G06Q 50/00; G06Q 50/04; G06Q 10/06; G06Q 30/0241; G06F 21/10; G06F 17/214
USPC .......................................................... 705/51
See application file for complete search history.

(56) References Cited

U.S. PATENT DOCUMENTS

| 6,233,684 | B1 * | 5/2001 | Stefik et al. ................... 713/176 |
| 6,898,601 | B2 * | 5/2005 | Amado et al. ........................ 1/1 |
| 7,263,655 | B1 * | 8/2007 | Carden, Jr. .................... 715/234 |
| 2004/0177056 | A1 * | 9/2004 | Davis et al. ........................ 707/1 |
| 2005/0177784 | A1 * | 8/2005 | Andrews et al. ............... 715/513 |
| 2006/0253395 | A1 * | 11/2006 | Corbell ............................ 705/50 |
| 2008/0147661 | A1 * | 6/2008 | Carden ............................ 707/7 |
| 2009/0097049 | A1 * | 4/2009 | Cho ............................ 358/1.11 |

OTHER PUBLICATIONS

HP co-pending disclosures: PDNo.200803714-11 filed Apr. 28, 2009; U.S. Appl. No. 12/431,437; Title: System and Method for Publishing Collaboration.

* cited by examiner

*Primary Examiner* — James D Nigh
(74) *Attorney, Agent, or Firm* — HP Patent Dept.

(57) ABSTRACT

A system and method is disclosed for managed distribution of publication assets. The method discloses: protecting a set of assets, retrieved from the server system, in a publication component; transferring the publication component with the protected assets from the server to client computers; previewing the publication component on one client computer based on the set of protected assets; and producing the publication component on another client computer based on the set of protected assets. The system discloses: a server system; a publication management module for: applying a set of fonts to a publication component; and transferring the publication component with the protected fonts from a server to client computers; a preview module for previewing the publication component on one client computer based on the set of protected fonts; and a production module for producing the publication component on another client computer based on the set of protected fonts.

20 Claims, 2 Drawing Sheets

SYSTEM AND METHOD FOR MANAGED DISTRIBUTION OF PUBLICATION ASSETS

BACKGROUND OF THE INVENTION

Field of the Invention

The present invention relates generally to systems and methods of publication, and more particularly to the management of assets associated with publication.

What is needed is a system and method for managed distribution of publication assets that overcomes the problems of the prior art.

BRIEF DESCRIPTION OF THE DRAWINGS

Some embodiments of the invention are described, by way of example, with respect to the following figures.

DETAILED DESCRIPTION OF THE PREFERRED EMBODIMENT

Figure 1:
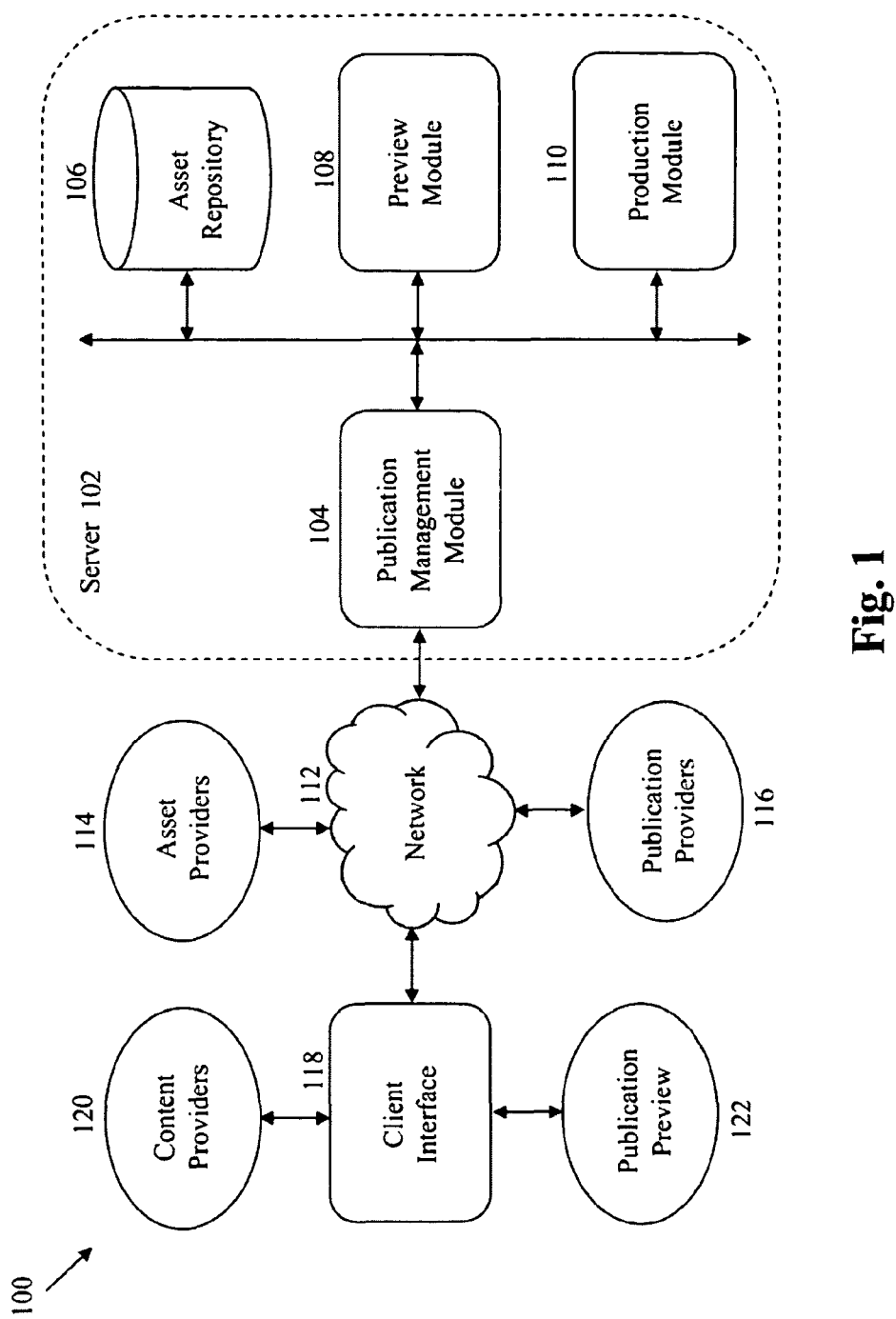
FIG. 1 is one embodiment of a system 100 for managed distribution of publication assets.

A consistent problem with displayed and printing digital publications, going back to the earliest desktop publishing systems, has been missing or incomplete system assets, such as fonts, which are not shared between multiple content creators, nor their print production systems. This is not surprising since content creators and print production systems are often quite distributed, and while a particular content creator on a particular network may have a font code, another content creator on a different network may not. This is also true for print production systems not co-located with either of these networks.

Such missing assets create unintended results, such as when the print production system either incorrectly deletes an unrecognized font code, or substitutes an incorrect font corresponding to the unrecognized font code.

One approach is for the content creators to "embed" an encrypted version of the font code in the document to be displayed or printed. But content creators commonly are not skilled with a technical understanding of how to embed such font codes, resulting in a failure of the publication to be displayed and/or printed properly.

Such a failure to properly embed such assets often goes unrecognized until well after the publication is sent for print production. Even more so if the user happened to have a unique font code that was properly displayed on the content creator's computer, but which resulted in a huge print production run littered with a variety of unintended character displays and undesirable print artifacts. This results in considerable lost time, user frustration, and costly inefficiencies.

Font codes also can be quite expensive, especially if the content creator desires a custom font which may only be used infrequently. Such fonts may also need to be purchased as part of a set, most of which the content creator never will use. The cost of such a font purchase is further multiplied when additional font packages need to be purchased other content creators or editors computers, as well as for the print production providers.

Such font packages may also have very different "terms of use" restrictions which forbid even embedding or transfer of the fonts to different computer and or printers. Tracking such disparate "terms of use" is quite an effort in itself, subject to further error and mistakes that could open various content providers and printers to legal violations.

The present invention addresses and remedies many, if not all, of the problems discussed above. Some of the advantages of the present invention include: avoiding "surprising" results due to improper "font" display and/or printing; providing a centrally managed distribution of publication assets, such as fonts, which both makes available for previewing and printing all content creators fonts, but also uniformly ensures that any asset "terms of use" are complied with, while compensating asset providers for their work; using a same set of assets for both previewing and print production, to ensure consistency from preview to print; and providing for easily accessible and uniform distribution of customized assets procured or generated by content creators with all other co-creators as well as the print production providers. Details of the present invention are now discussed.

FIG. 1 is one embodiment of a system 100 for managed distribution of publication assets. Publication assets are preferably defined as one or more fonts, however those skilled in the art recognize that assets may also include a variety of other publication or document resources, such as equation display codes, encrypted codes, templates, and other substitutable component which do not change the content of a publication, but do affect the visual display of such content. In other embodiments, the assets may also include a variety of content specific resources available over various networks, including: stock images, clip art, and textual information.

The system 100 includes a server 102 which itself includes a publication management module 104, an asset repository 106, a preview module 108, and a production module 110. The server 102 connects through a network 112 to sets of asset providers 114, and publication providers 116, as well as to a client interface 118, which links to a set of content providers 120 and functionality for publication preview 122. Note that while the present invention will primarily be discussed wherein the assets are fonts, those skilled in the art recognize the applicability of the teachings of the present invention to other types of assets as well. Also, while the present invention will be mostly discussed in terms of publications, the teachings of the present invention apply equally as well to publication components. Publication components are herein defined to include parts or elements within a publication, such as: a cover page, a set of images, text, headers, footers, tables of contents, media, and so on. Any publication can be divided into any arbitrary set of components based on the needs of those generating the publication.

The server 102 of the present invention provides a system 100 architecture which enables assets, such as fonts, to be centrally managed and distributed, so as to ensure that content providers 120 and publication providers 116, as well as others, have equal opportunities to access such assets in support of their respective creation and production activities. This centrally managed architecture also ensure that any "terms of use" and fee arrangements for such assets are complied with, as will be discussed below. The network 112 which the server 102 connects to can be an internal LAN, a web-based network, a cloud network, as well as many other forms. In an alternate embodiment, the entire invention may be included within a single personal computer.

To begin, one or more of the content providers 120 designs, adds content to, and edits an initial draft of a publication, such as a periodical magazine, a book, a newspaper, a package label, a ticket, brochures, flyers, handouts, and other works. The design typically refers to a layout of the content, and the content typically includes text, images, media, and links to other content. The content provider 120 then preferably uploads a copy of the publication to the server 102, over the network 112 via the client interface 118.

The publication management module 104 receives the publication and assigns an initial set of assets (e.g. set of fonts), retrieved from the asset repository 106, to the publication. The publication management module 104 centrally manages and distributes these assets, preferably fonts, which are stored in the asset repository 106. The management module 104 obtains these assets from a variety of asset providers 114.

The asset providers 114 can take many forms, from an individual font designer, to a font set provided with an application program, as well as pooled assets available from any source over the network 112. The asset providers 114 create new fonts which the management module 104 uploads into the asset repository 106 for distribution to the content providers 120 and publication providers 116 as well as any other interested parties. Such new fonts can be provided by the asset providers 114 either asynchronously at the whim of the asset providers 114, or in response to a formal request by either the publication management module 104, the content providers 120, or the publication providers 116. Over time, the asset repository 106 will accumulate a whole library of distributable assets.

The initial set of assets and the publication are sent by the publication management module 104 to the preview module 108. The preview module 108 generates a publication preview 122 by preferably embedding the encrypted fonts into the publication. Embedding the encrypted fonts enables control over the assets to be maintained. The publication management module 104 then permits the preview module 108 to send the publication preview 122 back to the content provider 120 through the network 112, and client interface 118.

Note that in this preferred embodiment, the publication management module 104 in the central server 102 maintains control over the fonts, and preferably ensures that only embedded and encrypted fonts are sent back through the client interface 118 for preview. In this preferred embodiment, the publication management module 104 uniformly enforces various terms of use for the fonts and provides consideration to the asset providers 114. Such consideration is preferably provided to the asset providers 114 only after the content providers 120 make a final asset (e.g. font) selection, as will be discussed below. In this way the content providers 120 can "try out" various fonts through the preview process before having to "purchase" them.

However, in an alternate embodiment, the fonts are still centrally controlled and distributed by the publication management module 104 in the central server 102, but are instead sent back to the client interface 118 without embedding or encrypting, and then the client interface 118 generates the publication preview 122 directly. In such an alternate embodiment the publication preview 122 could alternatively be generated from a lower quality (e.g. lower resolution with fewer pixels) or raster version of the publication with the fonts and/or other assets applied thereto.

Using either of the embodiments just described, neither the content providers 120 nor the client interface 118 needs to have a copy of the font set, since the set of fonts are readily available from the server 102. In this manner, the content providers 120 after reviewing the publication preview 122, can proceed to iteratively instruct the publication management module 104 to select different set of fonts that can be assigned to the publication. Though management of the fonts on the server 102, such fonts thus need not take up space on the client interface 118 nor are there concerns that different versions of the fonts existed on different client interfaces or that certain fonts were missing and/or otherwise unavailable.

Once the content providers 120 are satisfied with the publication preview 122 generated by the assigned set of fonts, the publication management module 104 presents the content providers 120 with set of asset (e.g. font) "terms of use", "licensing" and "purchasing" options. Those skilled in the art will be aware of a many different "terms of use", "licensing" and "purchasing" options that could be applied to the assets. Some of these options include: a per-publication option; a short-run option, a period of time option, a flat fee option, a premium user bundle option, as well as an outright purchase of the assets. For example, a content provider 120 could purchase a set of fonts just for a specific issue of a magazine, book or newspaper.

Such central enforcement by the publication management module 104 of the terms of use and consistent payment of fees to the asset providers 114, creates a dynamic forum for both content providers 120 and asset providers 114 as well. Since content providers 120 need not pay for a font set until after previewing perhaps many different font sets, the content providers 120 can select "just the right" set of assets that meet their needs. Similarly, efficient payments to the asset providers 114 encourages the asset providers 114 to further expand the library of assets (e.g. fonts) to be made available to all content providers 120 from the asset repository 106.

Upon the content providers' 120 selection of a set of "terms of use", "licensing" and/or "purchasing" options, the publication management module 104 transfers a portion of the fees charged to the content providers 120 to the asset providers 114.

Once the content providers 120 are satisfied with the publication preview 122 generated by the assigned set of fonts, and agree with the terms of use associated with the assigned set of fonts, the publication management module 104 sends the publication content and assigned set of fonts to the production module 110.

The production module 110 generates a final version of the publication preferably using the exact same set of assets (e.g. fonts) that were used by the preview module 108 to generate the publication preview 122. In this way what the content providers 120 saw in the publication preview 122 is exactly what the content providers 120 will see when the final version of the publication is finally produced (e.g. printed). Using the present invention, there is no longer the potential for mismatch between pre-production assets and print production assets since the system 100 ensures that the same assets are used in both cases. Thus, no surprises, no missing fonts, and no unacceptable font substitutions.

The production module 110 then sends the final version of the publication to the publication providers 116 for production (e.g. printing). The set of fonts used in the final version of the publication are preferably embedded and encrypted within the publication.

Figure 2:
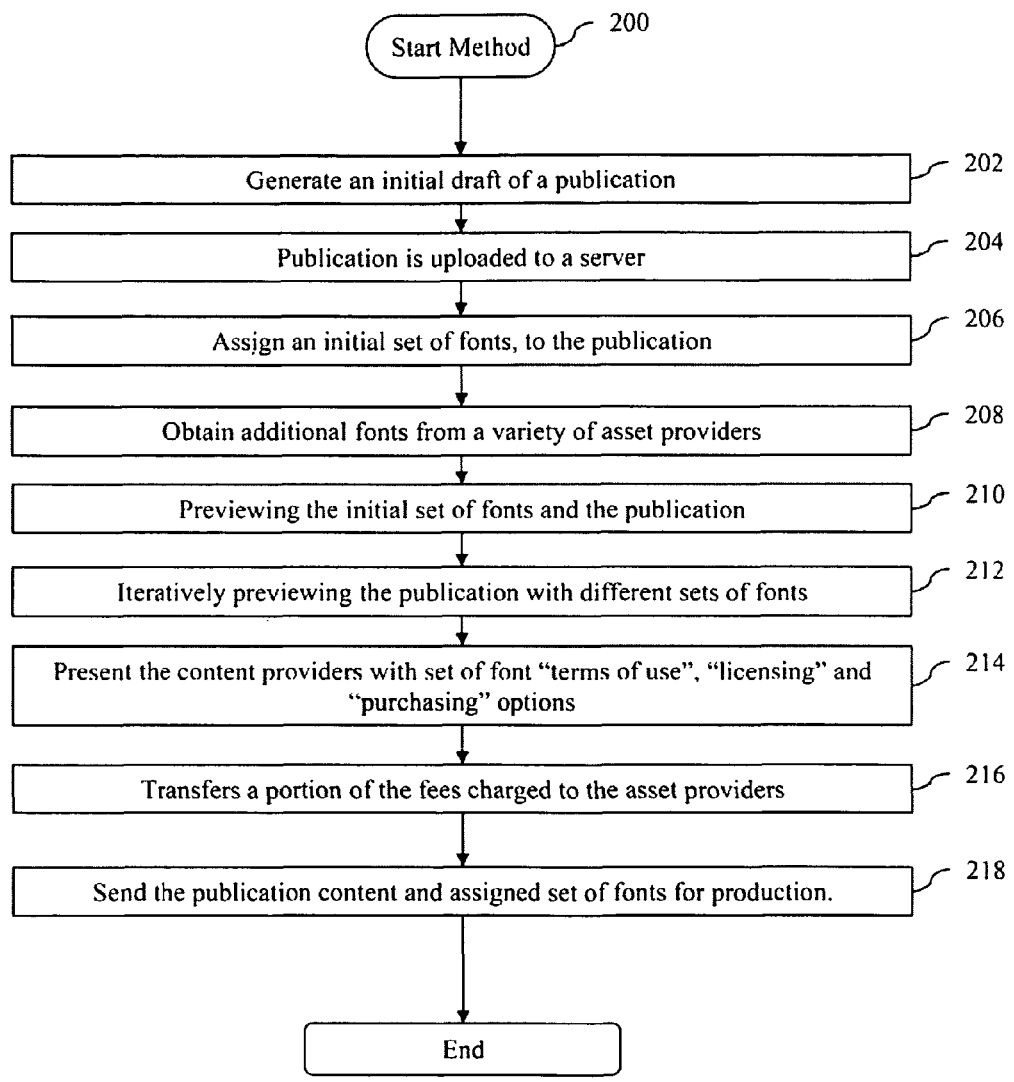
FIG. 2 is a flowchart of one embodiment of a method 200 for managed distribution of publication assets.

FIG. 2 is a flowchart of one embodiment of a method 200 for managed distribution of publication assets. Those skilled in the art will recognize that while one embodiment of the present invention's method is now discussed, the material in this specification can be combined in a variety of ways to yield other embodiments as well. The method steps now discussed are to be understood within a context provided by this and other portions of this detailed description.

The method 200 begins in step 202, where the content providers 120 design, add content to, and edit an initial draft of a publication. Next, in step 204, the initial draft of the publication is uploaded to the server 102. In step 206, the publication management module 104 receives the publication and assigns an initial set of fonts, to the publication. In step 208, the management module 104 obtains additional fonts from a variety of asset providers 114.

In step 210 the publication management module 104 sends an embedded and encrypted version of the initial set of fonts and the publication to the preview module 108 for previewing by the content provider 120. Next in step 212, the content providers 120 iteratively instruct the publication management module 104 to assign different sets of fonts to the publication for previewing. In step 214, the publication management module 104 presents the content providers 120 with set of font "terms of use", "licensing" and "purchasing" options.

Next in step 216, upon the content providers' 120 selection of a set of "terms of use", "licensing" and/or "purchasing" options, the publication management module 104 transfers a portion of the fees charged to the content providers 120 to the asset providers 114. Then in step 218, the publication management module 104 sends the publication content and assigned set of fonts to the production module 110 for production.

Note, a set of files refers to any collection of files, such as a directory of files. A "file" can refer to any data object (e.g., a document, a bitmap, an image, an audio clip, a video clip, software source code, software executable code, etc.). A "file" can also refer to a directory (a structure that contains other files).

Instructions of software described above are loaded for execution on a processor. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations thereof. It is intended that the following claims cover such modifications and variations as fall within the true spirit and scope of the invention.

What is claimed is:

1. A method executed by a computer for managed distribution of publication assets, comprising:
uploading a publication component to a server system;
embedding a non-embedded set of assets, retrieved from the server system, into the publication component;
transferring the publication component with the embedded assets from the server to a first client computer;
previewing the publication component on the first client computer based on the set of embedded assets; and
upon acceptance of the previewed publication component, producing the publication component on a second client computer based on the set of embedded assets.

2. The method of claim 1:
wherein the assets are one from a group including: fonts, equation display codes, encrypted codes, templates, and a substitutable component having an effect on an imaging of the publication component.

3. The method of claim 1:
wherein the assets are fonts;
wherein embedding includes: encrypting the assets; and
further comprising: storing an unencrypted set of the fonts only on the server system; and
wherein transferring includes: transferring only an encrypted set of the fonts from the server to the first client computer.

4. The method of claim 1:
wherein the publication component is part of one from a group including: a magazine, a book, a newspaper, a periodical, media, a package label, a ticket, brochures, flyers and handouts.

5. The method of claim 1, further comprising:
receiving a different asset selection from the first client computer; and
embedding a next set of assets from the server system into the publication component in response to the selection; and
wherein previewing includes: previewing the publication component on the first client computer based on the next set of embedded assets; and
wherein producing includes: producing the publication component on the second client computer based on the next set of embedded assets upon acceptance of the previewed publication component based on the next set of embedded assets.

6. The method of claim 1:
wherein producing is one from a group including: printing, rendering, displaying, and saving to a file.

7. The method of claim 1, further comprising:
obtaining the set of assets from an asset provider; and
wherein the asset provider is one from a group including: an individual font designer, a font set provided with an application program, and a set of open-source assets.

8. The method of claim 1, further comprising:
identifying "terms of use" associated with the set of assets; and
enforcing the "terms of use".

9. The method of claim 8, wherein identifying includes:
identifying from the "terms of use" one from a group including: a payment term, a licensing term, a purchasing term, a per-publication term; a short-production run term, a period of use term, a flat fee term, and a premium user bundle term.

10. The method of claim 8, further comprising:
obtaining the set of assets from an asset provider; and
paying to the asset provider in accordance with the "terms of use".

11. An article comprising at least one non-transitory computer-readable storage medium containing instructions that when executed cause a computer system to:
upload a publication component to a server system;

apply a set of assets, retrieved from the server system, to the publication component;
protect the assets as applied to the publication component;
transfer the publication component with the protected assets from the server system to a first client computer;
preview the publication component on the first client computer based on the set of protected assets; and
upon acceptance of the previewed publication component, produce the publication component on a second client computer based on the set of protected assets.

12. The article of claim 11:
wherein the assets are fonts;
the instructions further causing the computer system to:
store an unencrypted set of the fonts only on the server system; and
wherein protecting includes: embedding and encrypting the unencrypted fonts into the publication component.

13. The article of claim 11:
wherein the assets are fonts;
the instructons further causing the computer system to:
store an unencrypted set of the fonts only on the server system; and
wherein protecting includes: generating a lower quality version of the publication component using the unencrypted set of the fonts.

14. The article of claim 11:
wherein the assets are fonts;
the instructions further causing the computer system to:
store an unencrypted set of the fonts only on the server system; and
wherein protecting includes: generating a raster version of the publication component using the unencrypted set of the fonts.

15. A system for managed distribution of publication assets, comprising:
a processor; and
a memory comprising processor executable instructions which when executed by the processor cause the processor to perform the method of:
embedding a non-embedded set of fonts, retrieved from a server system, into a publication component;
transferring the publication component with the embedded fonts from the server system to a first client computer;
previewing the publication component on the first client computer based on the set of embedded fonts; and
producing the publication component on a second client computer based on the set of embedded fonts upon acceptance of the previewed publication component.

16. The system of claim 15:
further comprising: an unencrypted set of the fonts stored only on the server system;
wherein the method further comprises:
encrypting the fonts; and
transferring only an encrypted set of the fonts from the server to the first client computer.

17. The system of claim 15:
wherein the publication component is part of one from a group including: a magazine, a book, a newspaper, a periodical, and a media.

18. The system of claim 15,
wherein the method further comprises:
paying an asset provider, the asset provider to generate the set of fonts having "terms of use" in accordance with the "terms of use".

19. The system of claim 15,
further comprising a set of assets generated by a content creator, the set of assets including content specific material; and
wherein the content specific material is one from a group including: stock images, clip art, and textual information.

20. The system of claim 15, wherein the publication component is produced by a publication provider.

* * * * *